United States Patent
Sun et al.

(10) Patent No.: US 12,468,274 B2
(45) Date of Patent: Nov. 11, 2025

(54) OPTIMAL SCHEDULING METHOD FOR ELECTRICITY-HEAT MULTI-ENERGY FLOW SYSTEM BASED ON HEAT SUPPLY PHASOR MODEL

(71) Applicant: TSINGHUA UNIVERSITY, Beijing (CN)

(72) Inventors: Hongbin Sun, Beijing (CN); Qinglai Guo, Beijing (CN); Bin Wang, Beijing (CN); Yuwei Chen, Beijing (CN); Zhaoguang Pan, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 605 days.

(21) Appl. No.: 17/886,439

(22) Filed: Aug. 11, 2022

(65) Prior Publication Data
US 2022/0390914 A1    Dec. 8, 2022

Related U.S. Application Data

(63) Continuation of application No. PCT/CN2021/070696, filed on Jan. 7, 2021.

(30) Foreign Application Priority Data

Feb. 13, 2020 (CN) .......................... 202010090172.8

(51) Int. Cl.
*G05B 19/042* (2006.01)

(52) U.S. Cl.
CPC .... *G05B 19/042* (2013.01); *G05B 2219/2639* (2013.01)

(58) Field of Classification Search
CPC .............. G05B 13/0235; G05B 19/042; G05B 2219/2639; F24D 19/1006; Y04S 10/50
See application file for complete search history.

(56) References Cited

U.S. PATENT DOCUMENTS

| | | | | |
|---|---|---|---|---|
| 8,126,685 B2* | 2/2012 | Nasle | ..................... | G05B 17/02 703/2 |
| 10,516,267 B2* | 12/2019 | Yoo | ..................... | H02J 3/008 |
| 11,487,273 B1* | 11/2022 | Zhao | ................. | G05B 19/41885 |
| 12,117,184 B2* | 10/2024 | Rosén | .................... | F24D 10/006 |
| 2008/0077368 A1* | 3/2008 | Nasle | .................... | G05B 17/02 703/4 |
| 2016/0172854 A1* | 6/2016 | Zhou | ......................... | H02J 3/28 700/291 |
| 2018/0254635 A1* | 9/2018 | Yoo | ........................ | G06Q 30/02 |
| 2021/0044146 A1* | 2/2021 | Dong | ........................ | H02J 3/46 |

FOREIGN PATENT DOCUMENTS

| | | | | |
|---|---|---|---|---|
| CN | 106056251 | A | 10/2016 | |
| CN | 107800158 | A | 3/2018 | |
| CN | 108446865 | A | 8/2018 | |
| CN | 108921727 | A | 11/2018 | |
| CN | 110543609 | A | 12/2019 | |
| CN | 111340271 | A | 6/2020 | |
| CN | 112928753 | A * | 6/2021 | ............... H02J 3/00 |

OTHER PUBLICATIONS

International Search Report in International Application No. PCT/CN/2021/070696, dated Apr. 6, 2021.
Chen, Cong et al. "Multi-objective Optimal Dispatch Method for Integrated Energy System Considering Exergy Efficiency", Automation of Electric Power Systems, vol. 43, No. 12, Jun. 25, 2019, pp. 60-67, DOI: 10.7500/AEPS20180731010.
The First Office Action in counterpart China Application No. 202010090172.8, dated Nov. 26, 2021.
Chen, Xiaobo. "Operation and scheduling optimization of a multi-energy complementary combined heat and power system.", Wanfang Data, dated May 30, 2018.
Notification to Grant Patent Right for Invention in counterpart China Application No. 202010090172.8, dated Feb. 9, 2022.

* cited by examiner

*Primary Examiner* — Scott T Baderman
*Assistant Examiner* — Mario M Velez-Lopez

(57) ABSTRACT

An optimal scheduling method of an electricity-heat multi-energy flow system based on a heat supply phasor model is provided. The method considers a mutual influence of the electricity-heat system, establishes a constraint equation of a heat supply system in a phasor form, considers dynamic characteristics of the heat supply system, and realizes an optimal scheduling of the electricity-heat multi-energy flow system.

1 Claim, No Drawings

OPTIMAL SCHEDULING METHOD FOR ELECTRICITY-HEAT MULTI-ENERGY FLOW SYSTEM BASED ON HEAT SUPPLY PHASOR MODEL

CROSS-REFERENCE TO RELATED APPLICATIONS

This application is a continuation of International Application No. PCT/CN2021/070696, filed on Jan. 7, 2021, which is based on and claims priority to Chinese Patent Application No. 202010090172.8, filed on Feb. 13, 2020, titled "optimal scheduling method for electricity-heat multi-energy flow system based on heat supply phasor model", the entire disclosure of which is incorporated herein by its references.

FIELD

The present disclosure relates to an optimal scheduling method for an electricity-heat multi-energy flow system based on a heat supply phasor model, and belongs to the technical field of operation and control of power grids containing various energy forms.

BACKGROUND

Comprehensive utilization of energy is an important way for improving a utilization efficiency of comprehensive energy and promoting the consumption of renewable energy. It realizes an open interconnection of multiple types of energy and builds a multi-energy flow system by breaking a relatively fragmented state of the original energy flow subsystems such as electricity, heat, cold, gas, and transportation. The multi-energy flow refers to various types of energy flows, and represents mutual coupling, conversion and transmission of energy flows such as electricity, heat, cold, gas, transportation and the like. Compared with the traditional mutual-splitting energy system, the multi-energy flow system brings the following benefits: 1) through a cascade development and utilization and intelligent management of various types of energy, energy consumption and waste can be reduced, the utilization efficiency of comprehensive energy is improved, and the total energy utilization cost is reduced; 2) the characteristic difference, complementation and conversion of different energy are utilized, so that the capacity of consuming intermittent renewable energy sources is improved; 3) through the transfer, complementation and coordination control of multiple energy, the reliability of energy supply is improved, and more adjustable and controllable resources are provided for the operation of a power grid; 4) through collaborative planning and construction of the multi-energy flow system, repeated construction and waste of infrastructure can be reduced, and the asset utilization rate is improved.

On the one hand, the multi-energy flow system has considerable benefits, and on the other hand, the originally complex energy system is becoming more complex. The multi-energy flow system is composed of a plurality of energy flow subsystems that are interacted and influenced with each other, so that the complexity of the multi-energy flow system is remarkably increased, a plurality of new characteristics are reflected, a traditional method for analyzing each energy flow independently is difficult to adapt to new requirements, and a new multi-energy flow analysis method needs to be developed. In China, more and more coupling elements such as cogeneration units, heat pumps, electric boilers and the like objectively enhance the interconnection between electricity and heat, promote the development of an electricity-heat multi-energy flow system and also provide new requirements for the operation and control technology of the electricity-heat multi-energy flow system.

The optimal scheduling of an electricity-heat multi-energy flow system refers to that when structural parameters and load conditions of the system are given, available control variables (such as output power of a generator in a power grid, and a lift of a pump in a heat grid) are adjusted to find power flow distribution which can meet all operation constraint conditions and enable a certain performance index (such as total operation cost or network loss) of the system to reach a power flow distribution at an optimal value. At present, the research on the aspect is mainly based on a steady-state model of a heat supply system, an actual heat supply system has an obvious dynamic process, and in order to enable a scheduling result of an electricity-heat coupling multi-energy flow system to be more accurate, a dynamic process of the heat supply system needs to be considered, and the optimized scheduling method of the electricity-heat multi-energy flow system based on a heating phasor model is researched.

SUMMARY

The present disclosure aims to provide an optimal scheduling method for an electricity-heat multi-energy flow system based on a heat supply phasor model, so as to make up for the research in the related art, establish the electricity-heat multi-energy flow system scheduling model based on the heat supply phasor model, and realize the optimal scheduling of the electricity-heat multi-energy flow system considering the dynamic characteristics of the heat supply system.

The present disclosure provides an optimal scheduling method of an electricity-heat multi-energy flow system based on a heat supply phasor model, the method includes:

step 1: converting a load power of a heat supply system in the electricity-heat multi-energy flow system into a phasor form as:

$$\dot{Q}_{i,k\Omega}^{HL} = \frac{1}{K} v(k) \sum_{w=-K+1}^{K} q_i^{HL,\tau_w} e^{-jk\Omega\tau_w},$$

$$\forall k = 0, \ldots, K,$$

$$i \in I^{HL},$$

where $$v(k) = \begin{cases} 1 & k = 1, \ldots, K-1 \\ 1/2 & k = 0, K \end{cases},$$

$$\Omega = \frac{\pi}{K\Delta\tau},$$

a superscript HL represents a heat load identifier, $\dot{Q}_{i,k\Omega}^{HL}$ represents a heat consumption power phasor when a frequency of an $i^{th}$ heat load in the heat supply system is $k\Omega$, $q_i^{HL,\tau_w}$ represents a load power of the $i^{th}$ heat load in the heat supply system at a scheduling moment $\tau_w$, $\Omega$ represents a fundamental wave frequency of a phasor, K represents an order of the fundamental wave frequency of the phasor, a value of K is equal to a number of scheduling moments and $K\Omega=24$ hours, and $\Delta\tau$ represents a scheduling time interval;

step 2: setting constraint conditions of the heat supply system in the electricity-heat multi-energy flow system in the phasor form, including:

step 2-1: a constraint equation of a heat loss of a heat supply network pipe of the heat supply system in the phasor form being:

$$\dot{T}_{e,b,k\Omega} = \begin{cases} e^{-\frac{\lambda_b}{C_w m_b} L_b} \dot{T}_{s,b,k\Omega} + 1 - e^{-\frac{\lambda_b}{C_w m_b} L_b} t_{am}, k=0 \\ e^{-\frac{\lambda_b}{C_w m_b} L_b} e^{-jk\Omega \frac{\rho_w A_b}{m_b} L_b} \dot{T}_{s,b,k\Omega}, k=1, \ldots, K \end{cases}$$

$\forall b \in B^H,$ where, $B^H$ represents a set of numbers of pipes of the heat supply system, $\dot{T}_{s,b,k\Omega}$ represents a temperature phasor at a head end when a frequency of a $b^{th}$ pipe in the heat supply system is $k\Omega$, $\dot{T}_{e,b,k\Omega}$ represents a temperature phasor at a tail end when a frequency of the $b^{th}$ pipe in the heat supply system is $k\Omega$, $t_{am}$ represents an ambient temperature of the heat supply system, $m_b$ represents a flow of the $b^{th}$ pipe, $L_b$ represents a length of the $b^{th}$ pipe, $C_w$ represents a specific heat capacity of water, a value of the specific heat capacity is 4182 joule/(kilogram-degree centigrade), $\lambda_b$ represents a heat transfer coefficient per unit length of the $b^{th}$ pipe, and $\lambda_b$ is obtained from an energy management system of the electricity-heat coupled multi-energy flow system;

step 2-2: a constraint equation of a temperature of a multi-pipe junction of the heat supply system in the phasor form being:

$$\sum_{i \in S_n^{HS}} \dot{Q}_{i,k\Omega}^{HS} + C_w \sum_{b \in S_n^{H,in}} m_b \dot{T}_{e,b,k\Omega} = \sum_{i \in S_n^{HL}} \dot{Q}_{i,k\Omega}^{HL} + C_w \sum_{b \in S_n^{H,out}} m_b \dot{T}_{n,k\Omega},$$

$\forall n \in N^H,$ $k = 0, \ldots, K,$ where, a superscript HS represents an identifier of a heat source in the heat supply system, $\dot{Q}_{i,k\Omega}^{HS}$ represents a heat supply power phasor when a frequency of an $i^{th}$ heat source in the heat supply system is $k\Omega$, $\dot{T}_{e,b,k\Omega}$ represents a temperature phasor at a tail end when a frequency of a $b^{th}$ pipe in the heat supply system is $k\Omega$, $C_w$ represents a specific heat capacity of water, the value of the specific heat capacity is 4182 joule/(kilogram-degree centigrade), $m_b$ represents a flow of the $b^{th}$ pipe, $\dot{Q}_{i,k\Omega}^{HL}$ represents a heat consumption power phasor when a frequency of an $i^{th}$ heat load in the heat supply system is $k\Omega$, $\dot{T}_{n,k\Omega}$ represents a temperature phasor when a frequency of an nth node in the heat supply system is $k\Omega$, $S_n^{HS}$ represents a set of numbers of heat source nodes of the heat supply system, $S_n^{HL}$ represents a set of numbers of heat load nodes of the heat supply system, $S_n^{H,in}$ represents a set of numbers of pipes when a node at a tail end is the nth node in the heat supply system, and $S_n^{H,out}$ represents a set of numbers of pipes when a node at a head end is the nth node in the heat supply system;

step 2-3: a constraint equation of a temperature at a head end of the pipe of the heat supply system in the phasor form being:

$\dot{T}_{s,b,k\Omega} = \dot{T}_{n,k\Omega}, \forall b \in S_n^{H,out}, n \in N^H, k=0, \ldots, K,$ where, $\dot{T}_{s,b,k\Omega}$ represents a temperature phasor at a head end when a frequency of a $b^{th}$ pipe in the heat supply system is $k\Omega$, $\dot{T}_{n,k\Omega}$ represents a temperature phasor when a frequency of a nth node in the heat supply system is $k\Omega$, $S_n^{H,out}$ represents a set of numbers of pipes when a node at a head end is the nth node in the heat supply system, and $N^H$ represents a set of numbers of nodes of the heat supply system;

step 2-4: a constraint equation of a heat source phasor of the heat supply system with a Fourier inverse transform being:

$q_i^{HS,\tau_w} = \text{Re}(\Sigma_{k=0}^{K} \dot{Q}_{i,k\Omega}^{HS} e^{jk\Omega\tau_w}), \forall i \in I^{HS}, w=1, \ldots, K.$ where, a superscript HS represents an identifier of a heat source in the heat supply system, $q_i^{HS,\tau_w}$ represents a heat supply power of an $i^{th}$ heat source in the heat supply system at a scheduling moment $\tau_w$, a function $\text{Re}(\bullet)$ represents taking a real part of a complex number, $\dot{Q}_{i,k\Omega}^{HS}$ represents a heat supply power phasor when a frequency of the $i^{th}$ heat source in the heat supply system is $k\Omega$, and $I^{HS}$ represents a set of numbers of heat sources of the heat supply system;

step 2-5: a constraint equation of temperature historical data of a node of the heat supply system being:

$t_{n,his}^{\tau_w,his} = \text{Re}(\Sigma_{k=0}^{K} \dot{T}_{n,k\Omega} e^{jk\Omega\tau_{w,his}}), \forall n \in N^H, w = -K+1, \ldots, 0.$ where, $\tau_{n,his}^{\tau_w}$ represents a node temperature of an nth node in the heat supply system at a historical scheduling moment $\tau_{w,his}$, a function $\text{Re}(\bullet)$ represents taking a real part of a complex number, $\dot{T}_{n,k\Omega}$ represents a temperature phasor when a frequency of a nth node in the heat supply system is $k\Omega$, and $N^H$ represents a set of numbers of nodes of the heat supply system;

step 2-6: a constraint equation of a limit of the temperature of the node of the heat supply system being:

$\underline{t}_n \leq \text{Re}(\Sigma_{k=0}^{K} \dot{T}_{n,k\Omega} e^{jk\Omega\tau_w}) \leq \overline{t}_n, \forall n \in N^H, w=1, \ldots, K.$ where, $\underline{t}_n$ represents a lower temperature limit of an nth node in the heat supply system, $\overline{t}_n$ represents a upper temperature limit of the nth node in the heat supply system, a function $\text{Re}(\bullet)$ represents taking a real part of a complex number, $\dot{T}_{n,k\Omega}$ represents a temperature phasor when a frequency of the nth node in the heat supply system is $k\Omega$, and $N^H$ represents a set of numbers of nodes of the heat supply system;

step 2-7: constraint equations of a combined heat and power unit in the heat supply system being:

$p_i^{ES,\tau_w} = \Sigma_{\kappa,i}^{NK_i} \xi_{\kappa,i}^{\tau_w} P_{\kappa,i}, \forall i \in I^{CHP}, w=1, \ldots, K.$ $q_i^{HS,\tau_w} = \Sigma_{\kappa,i}^{NK_i} \xi_{\kappa,i}^{\tau_w} Q_{\kappa,i}, \forall i \in I^{CHP}, w=1, \ldots, K.$ $\Sigma_{\kappa=1}^{NK_i} \xi_{\kappa,i}^{\tau_w} Q_{\kappa,i}, \forall i \in I^{CHP}, w=1, \ldots, K.$ $\xi_{\kappa,i}^{\tau_w} \geq 0, \forall \kappa=1, \ldots, NK_i, i \in I^{CHP}, w=1, \ldots, K.$ where, a superscript ES represents a power supply identifier, $p_i^{ES,\tau_w}$ represents a power generation of an $i^{th}$ combined heat and power unit in the heat supply system at a scheduling moment $\tau_w$, $q_i^{HS,\tau_w}$ represents a heat supply power of the $i^{th}$ combined heat and power unit in the heat supply system at the scheduling moment $\tau_w$, $P_{\kappa,i}$ represents an abscissa of a $\kappa^{th}$ vertex of an approximate polygon of an running feasible domain of the $i^{th}$ combined heat and power unit, $Q_{\kappa,i}$ represents an ordinate of the $\kappa^{th}$ vertex of an approximate polygon of the running feasible domain of the $i^{th}$ combined heat and power unit, $\xi_{\kappa,i}^{\tau_w}$ represents a $\kappa^{th}$ combined coefficient of the $i^{th}$ combined heat and power unit at the scheduling moment $\tau_w$, $NK_i$ represents a number of vertexes of the approximate polygon of the running feasible domain of the $i^{th}$ combined heat and power unit, the approximate polygon of the running feasible domain of the combined heat and power unit is obtained from a factory specification of the combined heat and power unit, and $I^{CHP}$ represents a set of numbers of combined heat and power units in the heat supply system;

step 3: setting constraint conditions of a power system in the electricity-heat multi-energy flow system, including:

step 3-1: constraint equations of a direct current power flow of the power system being:

$$\sum_{i \in I^{ES}} p_i^{ES, \tau_w} = \sum_{n \in N^E} p_n^{EL, \tau_w},$$

$\forall w = 1, \ldots, K,$ $$-F_b \leq \sum_{n \in N^E} \Phi_{b,n} \left( \sum_{i \in S_n^{ES}} p_i^{ES, \tau_w} - p_n^{EL, \tau_w} \right) \leq F_b,$$

$\forall b \in B^E,$ $w = 1, \ldots, K,$ where, a superscript ES represents a power supply identifier, $p_i^{ES, \tau_w}$ represents a power generation of an $i^{th}$ generator unit in the power system at a scheduling moment $\tau_w$, $p_n^{EL, \tau_w}$ represents an electrical load power of an nth node in the heat supply system at a scheduling moment $\tau_w$, $I^{ES}$ represents a set of numbers of generator units of the power system, $N^E$ represents a set of numbers of nodes of the power system, $F_b$ represents an upper limit of a power of a $b^{th}$ line in the power system, $\Phi_{b,n}$ represents a transfer distribution factor between the nth node and the $b^{th}$ line in the power system, $S_n^{ES}$ represents a set of generator units on the nth node in the power system, and $B^E$ represents a set of lines in the power system;

step 3-2: a constraint equation of the generator unit in the power system being:

$\underline{p}_i \leq p_i^{ES, \tau_w} \leq \overline{p}_i, \forall i \in I^{TU}, w = 1, \ldots, K.$ where, a superscript TU represents an identifier of anther generator unit except the combined heat and power unit in the power system, $\underline{p}_i$ represents a lower power limit of an $i^{th}$ generator unit in the power system, $\overline{p}_i$ represents an upper power limit of the $i^{th}$ generator unit in the power system, $p_i^{ES, \tau_w}$ represents a power of the $i^{th}$ generator unit in the power system at a scheduling moment $\tau_w$, and $I^{TU}$ represents a set of numbers of the generator units of the power system;

step 4: establishing an objective function for optimal scheduling the electricity-heat multi-energy flow system, wherein the objective function is:

$$\sum_{w=1}^{K} \left( \sum_{i \in I^{CHP}} c_i^{CHP, \tau_w} + \sum_{i \in I^{TU}} c_i^{TU, \tau_w} \right),$$

where, $c_i^{CHP, \tau_w}$ represents an operation cost of an $i^{th}$ combined heat and power unit in the heat supply system at a scheduling moment $\tau_w$, $c_i^{TU, \tau_w}$ represents an operation cost of an $i^{th}$ generator unit in the power system at the scheduling moment $\tau_w$, $I^{CHP}$ represents a set of numbers of combined heat and power units in the heat supply system, $I^{TU}$ represents a set of numbers of generator units in the power system, and specific expressions of $c_i^{CHP, \tau_w}$ and $c_i^{TU, \tau_w}$ are:

$$c_i^{CHP, \tau_w} = a_{0,i} + a_{1,i} p_i^{ES, \tau_w} + a_{2,i} q_i^{HS, \tau_w} + a_{3,i} (p_i^{ES, \tau_w})^2 + a_{4,i} (q_i^{HS, \tau_w})^2 + a_{5,i} p_i^{ES, \tau_w} q_i^{HS, \tau_w}, \forall i \in I^{CHP}.$$

$$c_i^{TU, \tau_w} = a_{0,i} + a_{1,i} p_i^{ES, \tau_w} + a_{3,i} (p_i^{ES, \tau_w})^2, \forall i \in I^{TU}.$$

where, $a_{0,i}$, $a_{1,i}$, $a_{2,i}$, $a_{3,i}$, $a_{4,i}$, and $a_{5,i}$ represents cost factors of an $i^{th}$ combined heat and power unit/generator unit, $a_{0,i}$, $a_{1,i}$, $a_{2,i}$, $a_{3,i}$, $a_{4,i}$, and $a_{5,i}$ are obtained from the energy management system of the electricity-heat coupled multi-energy flow system, $p_i^{ES, \tau_w}$ represents a power generation of the $i^{th}$ combined heat and power unit or generator unit at a scheduling moment $\tau_w$, and $q_i^{HS, \tau_w}$ represents a heat supply power of the $i^{th}$ combined heat and power unit at the scheduling moment $\tau^w$;

step 5: solving, by using an interior point method, an optimization model consisting of the objective function in step 4 and the constraint conditions in step 2 and step 3, obtaining the power generation of the generator unit, the power generation and the heat supply power of the combined heat and power unit in the electricity-heat multi-energy flow system as optimal scheduling parameters of the electricity-heat multi-energy flow system, to achieve the optimized scheduling of the electricity-heat multi-energy flow system based on the heat supply phasor model The optimal scheduling method of the electricity-heat multi-energy flow system based on the heat supply phasor model has the following advantages.

According to the optimal scheduling method of the electricity-heat multi-energy flow system based on the heat supply phasor model, a mutual influence of the electricity-heat system is considered, constraint equations of the heat supply system in the phasor form is established, the dynamic characteristic of the heat supply system is considered, and the optimal scheduling of the electricity-heat multi-energy flow system is achieved. Compared with the traditional model for optimizing and scheduling the existing electricity-heat multi-energy flow system, the phasor model can describe the dynamic characteristics of the heat supply system more accurately, so that the accuracy of the scheduling result of the electricity-heat multi-energy flow system is improved. The method can be applied to the formulation of the scheduling plan of the electricity-heat multi-energy flow system, and be beneficial to improving the energy utilization efficiency of the electricity-heat multi-energy flow system, increasing the accuracy of the scheduling plan and reducing the operation cost.

DESCRIPTION OF EMBODIMENTS

The present disclosure provides an optimal scheduling method of an electricity-heat multi-energy flow system based on a heat supply phasor model. The method includes the following steps.

Step 1: a load power of a heat supply system in the electricity-heat multi-energy flow system is converted into a phasor form as:

$$\dot{Q}_{i,k\Omega}^{HL} = \frac{1}{K} v(k) \sum_{w=-K+1}^{K} q_i^{HL,\tau_w} e^{-jk\Omega\tau_w},$$

$$\forall k = 0, \ldots, K, i \in I^{HL},$$

where $$v(k) = \begin{cases} 1 & k = 1, \ldots, K-1 \\ 1/2 & k = 0, K \end{cases},$$

$$\Omega = \frac{\pi}{K\Delta\tau},$$

a superscript HL represents a heat load identifier, $\dot{Q}_{i,k\Omega}^{HL}$ represents a heat consumption power phasor when a frequency of an $i^{th}$ heat load in the heat supply system is k$\Omega$, $q_i^{HL,\tau_w}$ represents a load power of the $i^{th}$ heat load in the heat supply system at a scheduling moment $\tau_w$, $\Omega$ represents a fundamental wave frequency of a phasor, K represents an order of the fundamental wave frequency of the phasor, a value of K is equal to a number of scheduling moments and K$\Omega$=24 hours, and $\Delta\tau$ represents a scheduling time interval.

Step 2: constraint conditions of the heat supply system in the electricity-heat multi-energy flow system are set in the phasor form. Step 2 includes the followings.

Step 2-1: a constraint equation of a heat loss of a heat supply network pipe of the heat supply system in the phasor form is $$\dot{T}_{e,b,k\Omega} = \begin{cases} e^{-\frac{\lambda_b}{C_w m_b} L_b} \dot{T}_{s,b,k\Omega} + 1 - e^{-\frac{\lambda_b}{C_w m_b} L_b} t_{am}, & k = 0 \\ e^{-\frac{\lambda_b}{C_w m_b} L_b} e^{-jk\Omega \frac{\rho_w A_b}{m_b} L_b} \dot{T}_{s,b,k\Omega}, & k = 1, \ldots, K \end{cases},$$

$$\forall b \in B^H,$$

where, $B^H$ represents a set of numbers of pipes of the heat supply system, $\dot{T}_{s,b,k\Omega}$ represents a temperature phasor at a head end when a frequency of a $b^{th}$ pipe in the heat supply system is k$\Omega$, $\dot{T}_{e,b,k\Omega}$ represents a temperature phasor at a tail end when a frequency of the $b^{th}$ pipe in the heat supply system is k$\Omega$, $t_{am}$ represents an ambient temperature of the heat supply system, $m_b$ represents a flow of the $b^{th}$ pipe, $L_b$ represents a length of the $b^{th}$ pipe, $C_w$ represents a specific heat capacity of water, a value of the specific heat capacity is 4182 joule/(kilogram-degree centigrade), $\lambda_b$ represents a heat transfer coefficient per unit length of the $b^{th}$ pipe, and $\lambda_b$ is obtained from an energy management system of the electricity-heat coupled multi-energy flow system.

Step 2-2: a constraint equation of a temperature of a multi-pipe junction of the heat supply system in the phasor form is:

$$\sum_{i \in S_n^{HS}} \dot{Q}_{i,k\Omega}^{HS} + C_w \sum_{b \in S_n^{H,in}} m_b \dot{T}_{e,b,k\Omega} = \sum_{i \in S_n^{HL}} \dot{Q}_{i,k\Omega}^{HL} + C_w \sum_{b \in S_n^{H,out}} m_b \dot{T}_{n,k\Omega},$$

$$\forall n \in N^H,$$

$$k = 0, \ldots, K,$$

where, a superscript HS represents an identifier of a heat source in the heat supply system, $\dot{Q}_{i,k\Omega}^{HS}$ represents a heat supply power phasor when a frequency of an $i^{th}$ heat source in the heat supply system is k$\Omega$, $\dot{T}_{e,b,k\Omega}$ represents a temperature phasor at a tail end when a frequency of a $b^{th}$ pipe in the heat supply system is k$\Omega$, $C_w$ represents a specific heat capacity of water, the value of the specific heat capacity is 4182 joule/(kilogram-degree centigrade), $m_b$ represents a flow of the $b^{th}$ pipe, represents a heat consumption power phasor when a frequency of an $i^{th}$ heat load in the heat supply system is k$\Omega$, $\dot{T}_{n,k\Omega}$ represents a temperature phasor when a frequency of an nth node in the heat supply system is k$\Omega$, $S_n^{HS}$ represents a set of numbers of heat source nodes of the heat supply system, $S_n^{HL}$ represents a set of numbers of heat load nodes of the heat supply system, $S_n^{H,in}$ represents a set of numbers of pipes when a node at a tail end is the nth node in the heat supply system, and $S_n^{H,out}$ represents a set of numbers of pipes when a node at a head end is the nth node in the heat supply system.

Step 2-3: a constraint equation of a temperature at a head end of the pipe of the heat supply system in the phasor form is:

$$\dot{T}_{s,b,k\Omega} = \dot{T}_{n,k\Omega}, \forall b \in S_n^{H,out}, n \in N^H, k = 0, \ldots, K$$

where, $\dot{T}_{s,b,k\Omega}$ represents a temperature phasor at a head end when a frequency of a $b^{th}$ pipe in the heat supply system is k$\Omega$, $\dot{T}_{n,k\Omega}$ represents a temperature phasor when a frequency of a nth node in the heat supply system is k$\Omega$, $S_n^{H,out}$ represents a set of numbers of pipes when a node at a head end is the nth node in the heat supply system, and $N^H$ represents a set of numbers of nodes of the heat supply system.

Step 2-4: a constraint equation of a heat source phasor of the heat supply system with a Fourier inverse transform is:

$$q_i^{HS,\tau_w} = \text{Re}(\Sigma_{k=0}^{K} \dot{Q}_{i,k\Omega}^{HS} e^{jk\Omega\tau_w}), \forall i \in I^{HS}, w = 1, \ldots, K.$$

where, a superscript HS represents an identifier of a heat source in the heat supply system, $q_i^{HS,\tau_w}$ represents a heat supply power of an $i^{th}$ heat source in the heat supply system at a scheduling moment $\tau_w$, a function Re(●) represents taking a real part of a complex number, $\dot{Q}_{i,k\Omega}^{HS}$ represents a heat supply power phasor when a frequency of the $i^{th}$ heat source in the heat supply system is k$\Omega$, and $I^{HS}$ represents a set of numbers of heat sources of the heat supply system.

Step 2-5: a constraint equation of temperature historical data of a node of the heat supply system is:

$$t_{n,his}^{\tau_w,his} = \text{Re}(\Sigma_{k=0}^{K} \dot{T}_{n,k\Omega} e^{jk\Omega\tau_{w,his}}), \forall n \in N^H, w = -K+1, \ldots, 0.$$

where, $t_{n,his}^{\tau_w}$ represents a node temperature of an nth node in the heat supply system at a historical scheduling moment $\tau_{w,his}$, a function Re(●) represents taking a real part of a complex number, $\dot{T}_{n,k\Omega}$ represents a temperature phasor when a frequency of a nth node in the heat supply system is k$\Omega$, and $N^H$ represents a set of numbers of nodes of the heat supply system.

Step 2-6: a constraint equation of a limit of the temperature of the node of the heat supply system is:

$$\underline{t}_n \leq \text{Re}(\Sigma_{k=0}^{K} \dot{T}_{n,k\Omega} e^{jk\Omega\tau_w}) \leq \bar{t}_n, n \in N^H, w = 1, \ldots, K.$$

where, $\underline{t}_n$ represents a lower temperature limit of an nth node in the heat supply system, $\bar{t}_n$ represents a upper temperature limit of the nth node in the heat supply system, a function Re(●) represents taking a real part of a complex number, $\dot{T}_{n,k\Omega}$ represents a temperature phasor when a frequency of the nth node in the heat supply system is kΩ, and $N^H$ represents a set of numbers of nodes of the heat supply system.

Step 2-7: constraint equations of a combined heat and power unit in the heat supply system is:

$$p_i^{ES,\tau_w} = \sum_{\kappa,i}^{NK_i} \xi_{\kappa,i}^{\tau_w} P_{\kappa,i}, \forall i \in I^{CHP}, w=1,\ldots,K.$$

$$q_i^{HS,\tau_w} = \sum_{\kappa,i}^{NK_i} \xi_{\kappa,i}^{\tau_w} Q_{\kappa,i}, \forall i \in I^{CHP}, w=1,\ldots,K.$$

$$\sum_{\kappa=1}^{NK_i} \xi_{\kappa,i}^{\tau_w} Q_{\kappa,i} \forall i \in I^{CHP}, w=1,\ldots,K.$$

$$\xi_{\kappa,i}^{\tau_w} \geq 0, \forall \kappa=1,\ldots,NK_i, i \in I^{CHP}, w=1,\ldots,K.$$

where, a superscript ES represents a power supply identifier, $p_i^{ES,\tau_w}$ represents a power generation of an $i^{th}$ combined heat and power unit in the heat supply system at a scheduling moment $\tau_w$, $q_i^{HS,\tau_w}$ represents a heat supply power of the $i^{th}$ combined heat and power unit in the heat supply system at the scheduling moment $\tau_w$, $P_{\kappa,i}$ represents an abscissa of a $\kappa^{th}$ vertex of an approximate polygon of an running feasible domain of the $i^{th}$ combined heat and power unit, $Q_{\kappa,i}$ represents an ordinate of the $\kappa^{th}$ vertex of an approximate polygon of the running feasible domain of the $i^{th}$ combined heat and power unit, $\xi_{\kappa,i}^{\tau_w}$ represents a $\kappa^{th}$ combined coefficient of the $i^{th}$ combined heat and power unit at the scheduling moment $\tau_w$, $NK_i$ represents a number of vertexes of the approximate polygon of the running feasible domain of the $i^{th}$ combined heat and power unit, the approximate polygon of the running feasible domain of the combined heat and power unit is obtained from a factory specification of the combined heat and power unit, and $I^{CHP}$ represents a set of numbers of combined heat and power units in the heat supply system.

Step 3: constraint conditions of a power system in the electricity-heat multi-energy flow system are set. Step 3 includes the followings.

Step 3-1: constraint equations of a direct current power flow of the power system are:

$$\sum_{i \in I^{ES}} p_i^{ES,\tau_w} = \sum_{n \in N^E} p_n^{EL,\tau_w},$$

$$\forall w=1,\ldots,K,$$

$$-F_b \leq \sum_{n \in N^E} \Phi_{b,n} \left( \sum_{i \in S_n^{ES}} p_i^{ES,\tau_w} - p_n^{EL,\tau_w} \right) \leq F_b,$$

$$\forall b \in B^E,$$

$$w=1,\ldots,K,$$

where, a superscript ES represents a power supply identifier, $p_i^{ES,\tau_w}$ represents a power generation of an $i^{th}$ generator unit in the power system at a scheduling moment $\tau_w$, $p_n^{EL,\tau_w}$ represents an electrical load power of an nth node in the heat supply system at a scheduling moment $\tau_w$, $I^{ES}$ represents a set of numbers of generator units of the power system, N E represents a set of numbers of nodes of the power system, $F_b$ represents an upper limit of a power of a $b^{th}$ line in the power system, $\Phi_{b,n}$ represents a transfer distribution factor between the nth node and the $b^{th}$ line in the power system, $S_n^{ES}$ represents a set of generator units on the nth node in the power system, and $B^E$ represents a set of lines in the power system.

Step 3-2: a constraint equation of the generator unit in the power system is:

$$\underline{p}_i \leq p_i^{ES,\tau_w} \leq \overline{p}_i, \forall i \in I^{TU}, w=1,\ldots,K.$$

where, a superscript TU represents an identifier of anther generator unit except the combined heat and power unit in the power system, $\underline{p}_i$ represents a lower power limit of an $i^{th}$ generator unit in the power system, $\overline{p}_i$ represents an upper power limit of the $i^{th}$ generator unit in the power system, $p_i^{ES,\tau_w}$ represents a power of the $i^{th}$ generator unit in the power system at a scheduling moment $\tau_w$, and $I^{TU}$ represents a set of numbers of the generator units of the power system.

Step 4: an objective function for optimal scheduling the electricity-heat multi-energy flow system is established. The objective function is:

$$\sum_{w=1}^{K} \left( \sum_{i \in I^{CHP}} c_i^{CHP,\tau_w} + \sum_{i \in I^{TU}} c_i^{TU,\tau_w} \right).$$

where, $c_i^{CHP,\tau_w}$ represents an operation cost of an $i^{th}$ combined heat and power unit in the heat supply system at a scheduling moment $\tau_w$, $c_i^{TU,\tau_w}$ represents an operation cost of an $i^{th}$ generator unit in the power system at the scheduling moment $\tau_w$, $I^{CHP}$ represents a set of numbers of combined heat and power units in the heat supply system, $I^{TU}$ represents a set of numbers of generator units in the power system, and specific expressions of $c_i^{CHP,\tau_w}$ and $c_i^{TU,\tau_w}$ are:

$$c_i^{CHP,\tau_w} = a_{0,i} + a_{1,i} p_i^{ES,\tau_w} + a_{2,i} q_i^{HS,\tau_w} + a_{3,i} (p_i^{ES,\tau_w})^2 + a_{4,i} (q_i^{HS,\tau_w})^2 + a_{5,i} p_i^{ES,\tau_w} q_i^{HS,\tau_w}, \forall i \in I^{CHP}.$$

$$c_i^{TU,\tau_w} = a_{0,i} + a_{1,i} p_i^{ES,\tau_w} + a_{3,i} (p_i^{ES,\tau_w})^2, \forall i \in I^{TU}.$$

where, $a_{0,i}$, $a_{1,i}$, $a_{2,i}$, $a_{3,i}$, $a_{4,i}$, and $a_{5,i}$ represents cost factors of an $i^{th}$ combined heat and power unit/generator unit, $a_{0,i}$, $a_{1,i}$, $a_{2,i}$, $a_{3,i}$, $a_{4,i}$, and $a_{5,i}$ are obtained from the energy management system of the electricity-heat coupled multi-energy flow system, $p_i^{ES,\tau_w}$ represents a power generation of the $i^{th}$ combined heat and power unit or generator unit at a scheduling moment $\tau_w$, and $q_i^{HS,\tau_w}$ represents a heat supply power of the $i^{th}$ combined heat and power unit at the scheduling moment $\tau_w$.

Step 5: an optimization model consisting of the objective function in step 4 and the constraint conditions in step 2 and step 3 is solved by using an interior point method, and the power generation of the generator unit, the power generation and the heat supply power of the combined heat and power unit in the electricity-heat multi-energy flow system are obtained as optimal scheduling parameters of the electricity-heat multi-energy flow system, to achieve the optimized scheduling of the electricity-heat multi-energy flow system based on the heat supply phasor model.

In the step (5), an Interior Point Method used for solving the equation is a method for solving a linear programming or nonlinear convex optimization problem, and is also a known public technology in the technical field.

What is claimed is:

1. An optimal scheduling method for an electricity-heat multi-energy flow system based on a heat supply phasor model, comprising:
step 1: converting a load power of a heat supply system in the electricity-heat multi-energy flow system into a phasor form as:

$$\dot{Q}_{i,k\Omega}^{HL} = \frac{1}{K}v(k)\sum_{w=-K+1}^{K} q_i^{HL,\tau_w} e^{-jk\Omega\tau_w},$$

$$\forall k = 0, \ldots, K, i \in I^{HL},$$

where $$v(k) = \begin{cases} 1 & k = 1, \ldots, K-1 \\ 1/2 & k = 0, K \end{cases},$$

$$\Omega = \frac{\pi}{K\Delta\tau},$$

a superscript HI, represents a heat load identifier, $\dot{Q}_{i,k\Omega}^{HL}$ represents a heat consumption power phasor when a frequency of an $i^{th}$ heat load in the heat supply system is $k\Omega$, $q_i^{HI,\tau_w}$ represents a load power of the $i^{th}$ heat load in the heat supply system at a scheduling moment $\tau_w$, $\Omega$ represents a fundamental wave frequency of a phasor, K represents an order of the fundamental wave frequency of the phasor, a value of K is equal to a number of scheduling moments and $K\Omega=24$ hours, and $\Delta\tau$ represents a scheduling time interval;

step 2: setting constraint conditions of the heat supply system in the electricity-heat multi-energy flow system in the phasor form, comprising:

step 2-1: a constraint equation of a heat loss of a heat supply network pipe of the heat supply system in the phasor form being:

$$\dot{T}_{e,b,k\Omega} = \begin{cases} e^{-\frac{\lambda_b}{C_w m_b}L_b}\dot{T}_{s,b,k\Omega} + 1 - e^{-\frac{\lambda_b}{C_w m_b}L_b}t_{am}, & k = 0 \\ e^{-\frac{\lambda_b}{C_w m_b}L_b}e^{-jk\Omega\frac{\rho_w A_b}{m_b}L_b}\dot{T}_{s,b,k\Omega}, & k = 1, \ldots, K \end{cases},$$

$$\forall b \in B^H,$$

where, $B^H$ represents a set of numbers of pipes of the heat supply system, $\dot{T}_{s,b,k\Omega}$ represents a temperature phasor at a head end when a frequency of a $b^{th}$ pipe in the heat supply system is $k\Omega$, $\dot{T}_{e,b,k\Omega}$ represents a temperature phasor at a tail end when a frequency of the $b^{th}$ pipe in the heat supply system is $k\Omega$, $t_{am}$ represents an ambient temperature of the heat supply system, $m_b$ represents a flow of the $b^{th}$ pipe, $L_b$ represents a length of the $b^{th}$ pipe, $C_w$ represents a specific heat capacity of water, a value of the specific heat capacity is 4182 joule/(kilogram-degree centigrade), $\lambda_b$ represents a heat transfer coefficient per unit length of the $b^{th}$ pipe, and $\lambda_b$ is obtained from an energy management system of the electricity-heat coupled multi-energy flow system;

step 2-2: a constraint equation of a temperature of a multi-pipe junction of the heat supply system in the phasor form being:

$$\sum_{i\in S_n^{HS}}\dot{Q}_{i,k\Omega}^{HS} + C_w\sum_{b\in S_n^{H,in}} m_b\dot{T}_{e,b,k\Omega} = \sum_{i\in S_n^{HL}}\dot{Q}_{i,k\Omega}^{HL} + C_w\sum_{b\in S_n^{H,out}} m_b\dot{T}_{n,k\Omega},$$

$$\forall n \in N^H,$$

$$k = 0, \ldots, K,$$

where, a superscript HS represents an identifier of a heat source in the heat supply system, $\dot{Q}_{i,k\Omega}^{HS}$ represents a heat supply power phasor when a frequency of an $i^{th}$ heat source in the heat supply system is $k\Omega$, $\dot{T}_{e,b,k\Omega}$ represents a temperature phasor at a tail end when a frequency of a $b^{th}$ pipe in the heat supply system is $k\Omega$, $C_w$ represents a specific heat capacity of water, the value of the specific heat capacity is 4182 joule/(kilogram-degree centigrade), $m_b$ represents a flow of the $b^{th}$ pipe, $\dot{Q}_{i,k\Omega}^{HL}$ represents a heat consumption power phasor when a frequency of an $i^{th}$ heat load in the heat supply system is $k\Omega$, $\dot{T}_{n,k\Omega}$ represents a temperature phasor when a frequency of an $n^{th}$ node in the heat supply system is $k\Omega$, $S_n^{HS}$ represents a set of numbers of heat source nodes of the heat supply system, $S_n^{HL}$ represents a set of numbers of heat load nodes of the heat supply system, $S_n^{H,in}$ represents a set of numbers of pipes when a node at a tail end is the $n^{th}$ node in the heat supply system, and $S_n^{H,out}$ represents a set of numbers of pipes when a node at a head end is the $n^{th}$ node in the heat supply system;

step 2-3: a constraint equation of a temperature at a head end of the pipe of the heat supply system in the phasor form being:

$$\dot{T}_{s,b,k\Omega} = \dot{T}_{n,k\Omega}, \forall b \in S_n^{H,out}, n \in N^H, k=0, \ldots, K,$$

where, $\dot{T}_{s,b,k\Omega}$ represents a temperature phasor at a head end when a frequency of a $b^{th}$ pipe in the heat supply system is $k\Omega$, $\dot{T}_{n,k\Omega}$ represents a temperature phasor when a frequency of a $n^{th}$ node in the heat supply system is $k\Omega$, $S_n^{H,out}$ represents a set of numbers of pipes when a node at a head end is the $n^{th}$ node in the heat supply system, and $N^H$ represents a set of numbers of nodes of the heat supply system;

step 2-4: a constraint equation of a heat source phasor of the heat supply system with a Fourier inverse transform being:

$$q_i^{HS,\tau_w}=\text{Re}(\Sigma_{k=0}^K \dot{Q}_{i,k\Omega}^{HS} e^{jk\Omega\tau_w}), \forall i \in I^{HS}, w=1, \ldots, K,$$

where, a superscript HS represents an identifier of a heat source in the heat supply system $q_i^{HS,\tau_w}$ represents a heat supply power of an $i^{th}$ heat source in the heat supply system at a scheduling moment $\tau_w$, a function $\text{Re}(\bullet)$ represents taking a real part of a complex number, $\dot{Q}_{i,k\Omega}^{HS}$ represents a heat supply power phasor when a frequency of the $i^{th}$ heat source in the heat supply system is $k\Omega$, and $I^{HS}$ represents a set of numbers of heat sources of the heat supply system;

step 2-5: a constraint equation of temperature historical data of a node of the heat supply system being:

$$t_{n,his}^{\tau_w,his}=\text{Re}(\Sigma_{k=0}^K \dot{T}_{n,k\Omega} e^{jk\Omega\tau_{w,his}}), \forall n \in N^H, w=-K+1, \ldots, 0,$$

where, $t_{n,his}^{\tau_w}$ represents a node temperature of an $n^{th}$ node in the heat supply system at a historical scheduling moment $\tau_{w,his}$, a function $\text{Re}(\bullet)$ represents taking a real part of a complex number, $\dot{T}_{n,k\Omega}$ represents a temperature phasor when a frequency of a $n^{th}$ node in the heat supply system is $k\Omega$, and $N^H$ represents a set of numbers of nodes of the heat supply system;

step 2-6: a constraint equation of a limit of the temperature of the node of the heat supply system being:

$$\underline{t}_n \leq \text{Re}(\Sigma_{k=0}^K \dot{T}_{n,k\Omega} e^{jk\Omega\tau_w}) \leq \overline{t}_n, \forall n \in N^H, w=1, \ldots, K,$$

where, $\underline{t}_n$ represents a lower temperature limit of an $n^{th}$ node in the heat supply system, $\overline{t}_n$ represents a upper temperature limit of the $n^{th}$ node in the heat supply system, a function $\text{Re}(\bullet)$ represents taking a real part of a complex number, $\dot{T}_{n,k\Omega}$ represents a temperature phasor when a frequency of the $n^{th}$ node in the heat supply system is $k\Omega$, and $N^H$ represents a set of numbers of nodes of the heat supply system;

step 2-7: constraint equations of a combined heat and power unit in the heat supply system being:

$$p_i^{ES,\tau_w} = \Sigma_{\kappa,i}^{NK_i} \xi_{\kappa,i}^{\tau_w} P_{\kappa,i}, \forall i \in I^{CHP}, w=1,\ldots,K,$$

$$q_i^{HS,\tau_w} = \Sigma_{\kappa,i}^{NK_i} \xi_{\kappa,i}^{\tau_w} Q_{\kappa,i}, \forall i \in I^{CHP}, w=1,\ldots,K,$$

$$\Sigma_{\kappa=1}^{NK_i} \xi_{\kappa,i}^{\tau_w} Q_{\kappa,i}, \forall i \in I^{CHP}, w=1,\ldots,K,$$

$$\xi_{\kappa,i}^{\tau_w} \geq 0, \forall \kappa=1,\ldots,NK_i, i \in I^{CHP}, w=1,\ldots,K,$$

where, a superscript ES represents a power supply identifier, $p_i^{ES,\tau_w}$ represents a power generation of an $i^{th}$ combined heat and power unit in the heat supply system at a scheduling moment $\tau_w$, $q_i^{HS,\tau_w}$ represents a heat supply power of the $i^{th}$ combined heat and power unit in the heat supply system at the scheduling moment $\tau_w$, $P_{\kappa,i}$ represents an abscissa of a $\kappa^{th}$ vertex of an approximate polygon of an running feasible domain of the $i^{th}$ combined heat and power unit, $Q_{\kappa,i}$ represents an ordinate of the $\kappa^{th}$ vertex of an approximate polygon of the running feasible domain of the $i^{th}$ combined heat and power unit, $\xi_{\kappa,i}^{\tau_w}$ represents a $\kappa^{th}$ combined coefficient of the $i^{th}$ combined heat and power unit at the scheduling moment $\tau_w$, $NK_i$ represents a number of vertexes of the approximate polygon of the running feasible domain of the $i^{th}$ combined heat and power unit, the approximate polygon of the running feasible domain of the combined heat and power unit is obtained from a factory specification of the combined heat and power unit, and $I^{CHP}$ represents a set of numbers of combined heat and power units in the heat supply system;

step 3: setting constraint conditions of a power system in the electricity-heat multi-energy flow system, comprising:

step 3-1: constraint equations of a direct current power flow of the power system being:

$$\sum_{i \in I^{ES}} p_i^{ES,\tau_w} = \sum_{n \in N^E} p_n^{EL,\tau_w},$$

$$\forall w = 1, \ldots, K,$$

$$-F_b \leq \sum_{n \in N^E} \Phi_{b,n}\left(\sum_{i \in S_n^{ES}} p_i^{ES,\tau_w} - p_n^{EL,\tau_w}\right) \leq F_b,$$

$$\forall b \in B^E,$$

$$w = 1, \ldots, K,$$

where, a superscript ES represents a power supply identifier, $p_i^{ES,\tau_w}$ represents a power generation of an $i^{th}$ generator unit in the power system at a scheduling moment $\tau_w$, $p_n^{EL,\tau_w}$ represents an electrical load power of an $n^{th}$ node in the heat supply system at a scheduling moment $\tau_w$, $I^{ES}$ represents a set of numbers of generator units of the power system, $N^E$ represents a set of numbers of nodes of the power system, $F_b$ represents an upper limit of a power of a $b^{th}$ line in the power system, $\Phi_{b,n}$ represents a transfer distribution factor between the $n^{th}$ node and the $b^{th}$ line in the power system, $S_n^{ES}$ represents a set of generator units on the $n^{th}$ node in the power system, and $B^E$ represents a set of lines in the power system;

step 3-2: a constraint equation of the generator unit in the power system being:

$$\underline{p}_i \leq p_i^{ES,\tau_w} \leq \overline{p}_i, \forall i \in I^{TU}, w=1,\ldots,K,$$

where, a superscript $^{TU}$ represents an identifier of anther generator unit except the combined heat and power unit in the power system, $\underline{p}_i$ represents a lower power limit of an $i^{th}$ generator unit in the power system, $\overline{p}_i$ represents an upper power limit of the $i^{th}$ generator unit in the power system, $p_i^{ES,\tau_w}$ represents a power of the $i^{th}$ generator unit in the power system at a scheduling moment $\tau_w$, and $I^{TU}$ represents a set of numbers of the generator units of the power system;

step 4: establishing an objective function for optimal scheduling the electricity-heat multi-energy flow system, wherein the objective function is:

$$\sum_{w=1}^{K}\left(\sum_{i \in I^{CHP}} c_i^{CHP,\tau_w} + \sum_{i \in I^{TU}} c_i^{TU,\tau_w}\right),$$

where, $c_i^{CHP,\tau_w}$ represents an operation cost of an $i^{th}$ combined heat and power unit in the heat supply system at a scheduling moment $\tau_w$, $c_i^{TU,\tau_w}$ represents an operation cost of an $i^{th}$ generator unit in the power system at the scheduling moment $\tau_w$, $I^{CHP}$ represents a set of numbers of combined heat and power units in the heat supply system, $I^{TU}$ represents a set of numbers of generator units in the power system, and specific expressions of $c_i^{CHP,\tau_w}$ and $c_i^{TU,\tau_w}$ are:

$$c_i^{CHP,\tau_w} = a_{0,i} + a_{1,i} p_i^{ES,\tau_w} + a_{2,i} q_i^{HS,\tau_w} + a_{3,i}(p_i^{ES,\tau_w})^2 + a_{4,i}(q_i^{HS,\tau_w})^2 + a_{5,i} p_i^{ES,\tau_w} q_i^{HS,\tau_w}, \forall i \in I^{CHP},$$

$$c_i^{TU,\tau_w} = a_{0,i} + a_{1,i} p_i^{ES,\tau_w} + a_{3,i}(p_i^{ES,\tau_w})^2, \forall i \in I^{TU},$$

where, $a_{0,i}$, $a_{1,i}$, $a_{2,i}$, $a_{3,i}$, $a_{4,i}$, and $a_{5,i}$ represents cost factors of an $i^{th}$ combined heat and power unit/generator unit, $a_{0,i}$, $a_{1,i}$, $a_{2,i}$, $a_{3,i}$, $a_{4,i}$, and $a_{5,i}$ are obtained from the energy management system of the electricity-heat coupled multi-energy flow system, $p_i^{ES,\tau_w}$ represents a power generation of the $i^{th}$ combined heat and power unit or generator unit at a scheduling moment $\tau_w$, and $q_i^{HS,\tau_w}$ represents a heat supply power of the $i^{th}$ combined heat and power unit at the scheduling moment $\tau_w$;

step 5: solving, by using an interior point method, an optimization model consisting of the objective function in step 4 and the constraint conditions in step 2 and step 3, obtaining the power generation of the generator unit, the power generation and the heat supply power of the combined heat and power unit in the electricity-heat multi-energy flow system as optimal scheduling parameters of the electricity-heat multi-energy flow system, to achieve the optimized scheduling of the electricity-heat multi-energy flow system based on the heat supply phasor model, and generating power by the generator unit in the power system in the electricity-heat multi-energy flow system based on the power generation of the generator unit obtained in step 5, and generating power and supplying heat by the combined heat and power unit in the heat supply system in the electricity-heat multi-energy flow system based on the power generation and the heat supply power of the combined heat and power unit obtained in step 5.

\* \* \* \* \*